(12) United States Patent
Santos et al.

(10) Patent No.: US 8,281,313 B1
(45) Date of Patent: Oct. 2, 2012

(54) SCHEDULING COMPUTER PROCESSING JOBS THAT HAVE STAGES AND PRECEDENCE CONSTRAINTS AMONG THE STAGES

(75) Inventors: Cipriano A. Santos, Modesto, CA (US); Dirk Beyer, Walnut Creek, CA (US); Yunhong Zhou, Sunnyvale, CA (US); Terence P. Kelly, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2133 days.

(21) Appl. No.: 11/241,720

(22) Filed: Sep. 29, 2005

(51) Int. Cl.
*G06F 9/46* (2006.01)

(52) U.S. Cl. ......... 718/106; 718/100; 718/101; 718/102

(58) Field of Classification Search ........................ None
See application file for complete search history.

(56) References Cited

U.S. PATENT DOCUMENTS

| | | | | |
|---|---|---|---|---|
| 5,392,430 | A * | 2/1995 | Chen et al. | 718/102 |
| 5,742,821 | A | 4/1998 | Prasanna | |
| 6,009,452 | A * | 12/1999 | Horvitz | 718/102 |
| 6,223,205 | B1 * | 4/2001 | Harchol-Balter et al. | 718/105 |
| 6,434,590 | B1 | 8/2002 | Blelloch et al. | |
| 6,779,183 | B1 * | 8/2004 | Chekuri et al. | 718/105 |
| 6,836,241 | B2 * | 12/2004 | Stone et al. | 342/357.63 |
| 7,072,960 | B2 * | 7/2006 | Graupner et al. | 709/223 |
| 7,146,353 | B2 * | 12/2006 | Garg et al. | 707/2 |
| 7,353,488 | B1 * | 4/2008 | Coffin et al. | 716/104 |
| 7,383,337 | B2 * | 6/2008 | Denton et al. | 709/226 |
| 7,480,913 | B2 * | 1/2009 | Buco et al. | 718/105 |
| 7,711,588 | B2 * | 5/2010 | Ouimet | 705/7.11 |
| 2002/0178260 | A1 * | 11/2002 | Chang | 709/225 |
| 2003/0037089 | A1 * | 2/2003 | Cota-Robles et al. | 709/1 |
| 2003/0084157 | A1 * | 5/2003 | Graupner et al. | 709/226 |
| 2003/0197641 | A1 * | 10/2003 | Stone et al. | 342/357.15 |
| 2004/0117794 | A1 | 6/2004 | Kundu | |
| 2005/0066239 | A1 * | 3/2005 | Keeton et al. | 714/47 |
| 2005/0183087 | A1 * | 8/2005 | Kubota | 718/100 |
| 2005/0198634 | A1 * | 9/2005 | Nielsen et al. | 718/100 |
| 2005/0204358 | A1 * | 9/2005 | Hellerstein et al. | 718/104 |
| 2005/0289312 | A1 * | 12/2005 | Ghosal et al. | 711/167 |
| 2006/0129771 | A1 * | 6/2006 | Dasgupta et al. | 711/162 |
| 2006/0150189 | A1 * | 7/2006 | Lindsley | 718/105 |
| 2006/0218551 | A1 * | 9/2006 | Berstis et al. | 718/102 |
| 2007/0124733 | A1 * | 5/2007 | Bril et al. | 718/104 |

OTHER PUBLICATIONS

Thomas L. Adam et al., A Comparison of List Schedules for Parallel Processing Systems, Communications of the ACM, 1974, 17(12):685-690, ACM Press, New York, NY.

(Continued)

*Primary Examiner* — Emerson Puente
*Assistant Examiner* — Adam Lee

(57) ABSTRACT

An embodiment of a method of scheduling computer processing begins with a first step of receiving job properties for a plurality of jobs to be processed in a multi-processor computing environment. At least some of the jobs each comprise a plurality of stages, one or more tasks for each stage, and precedence constraints among the stages. The method continues with a second step of determining a schedule for processing at least a subset of the plurality of jobs on processors within the multi-processor computing environment from a solution of a mathematical program that provides a near maximal completion reward. The schedule comprises a sequence of tasks for each processor. In a third step, the computer processing jobs are processed on the processors according to the sequence of tasks for each processor.

15 Claims, 2 Drawing Sheets

OTHER PUBLICATIONS

Ishfaq Ahmad et al., Analysis, Evaluation, and Comparison of Algorithms for Scheduling Task Graphs on Parallel Processors, Proceedings of the 1996 2nd International Symposium on Parallel Architectures, Algorithms, and Networks, (I-Span'96), 1996, 207-213, IEEE, Piscataway, NJ.

Ishfaq Ahmad et al., Automatic Parallelization and Scheduling of Programs on Multiprocessors using CASCH, Proceedings of the 1997 International Conference on Parallel Processing (ICPP'97), 1997, pp. 288-291, IEEE, Piscataway, NJ.

S. Baruah et al., On-line scheduling in the presence of overload, Proceedings of the 32nd Annual Symposium on Foundations of Computer Science, 1991, pp. 100-110, IEEE, Piscataway, NJ.

Peter Brucker, Scheduling Algorithms, 4th Ed., 2004, pp. 1-36, Springer-Verlag, Berlin, Germany.

Maui Cluster Scheduler, 2005, Cluster Resources Inc., Spanish Fork, UT. <http://www.supercluster.org/maui> [viewed on Aug. 19, 2005].

Condor Project Homepage, University of Wisconsin, Madison, WI. <http://www.cs.wisc.edu/condor/> [viewed on Aug. 19, 2005].

Michael L. Dertouzos et al., Multiprocessor On-Line Scheduling of Hard-Real-Time Tasks, IEEE transactions on Software Engineering, 1989, 15(12):1497-1506, IEEE, Piscataway, NJ.

Hesham El-Rewini et al., Task Scheduling in Multiprocessing Systems, Computer, 1995, 28(12):27-37, IEEE, Piscataway, NJ.

Dror G. Feitelson, Job Scheduling in Multiprogrammed Parallel Systems: Extended Version, IBM Research Rpt. RC 19790 (87657), Second Revision, 1997.

Michael Iverson et al., Dynamic, Competitive Scheduling of Multiple DAGs in a Distributed Heterogeneous Environment, 1998, Columbus OH.

Bala Kalyanasundaram et al., Speed is as Powerful as Clairvoyance, 1995, Pittsburgh PA.

Hans Kellerer et al., Knapsack Problems, 2004, pp. 1-42, Springer-Verlag, Berlin, Germany.

Yu-Kwong Kwok et al., Dynamic Critical-Path Scheduling: An effective Technique for Allocating Task Graphs to Multiprocessors, IEEE Transactions on Parallel and Distributed Systems, 1996, 7(5):506-521, IEEE, Piscataway, NJ.

Yu-Kwong Kwok et al., Static Scheduling Algorithms for Allocating Directed Task Graphs to Multiprocessors, ACM Computing Surveys, 1999, 31(4):407-471, ACM Press, New York, NY.

Benjamin S. Macey et al., A Performance Evaluation of CP List Scheduling Heuristics for Communication Intensive Task Graphs, 1998, Nedlands, Australia.

S. J. Noronha et al., Knowledge-Based Approaches for Scheduling Problems: A Survey, IEEE Transactions on Knowledge and Data Engineering, 1991, 3(3):160-171, IEEE, Piscataway, NJ.

Frank Padberg, Applying Process Simulation to Software Project Scheduling, 2003, Karlsruhe, Germany.

Cynthia A. Phillips et al., Optimal Time-Critical Scheduling Via Resource Augmentation (Extended Abstract), 1997, Albuquerque, NM.

Michael Pinedo, Scheduling: Theory, Algorithms, and Systems, Second Edition, 2002, Prentice-Hall, Upper Saddle River, NJ.

Platform LSF: Intelligent, policy-driven batch application workload processing, 2004, Platform Computing, Inc., Markahm, Ontario, Canada.

Jay Sethuraman et al., Optimal Stochastic Scheduling in Multiclass Parallel Queues, Proceedings of the 1999 ACM Sigmetrics international conference on Measurement and modeling of computer systems, 1999, pp. 93-102, ACM Press, New York, NY.

Jirí Sgall, On-Line Scheduling—A Survey, 1998, Praha, Czech Republic. <http://www.math.cas.cz/~sgall/ps/schsurv.ps>.

Simple Linux Utility for Resource Management, Jun. 23, 2005, SLURM Team, Livermore, CA. <http://www.llnl.gov/linux/slunn/slurm.html>.

Yueh-O Wang et al., Hindsight Helps: Deterministic Task Scheduling with Backtracking, 1997, College Station, TX.

Kent Wilken et al., Optimal Instruction Scheduling Using Integer Programming, Proceedings of the ACM SIGPLAN 2000 conference on Programming language design and implementation, pp. 121-133, ACM Press, New York, NY.

Min-You Wu et al., Runtime Parallel Incremental Scheduling of DAGs, Proceedings: 2000 International Conference on Parallel Processing, 2000, pp. 541-548, IEEE, Piscataway, NJ.

John Zahorjan et al., Processor Scheduling in Shared Memory Multiprocessors, Proceedings of the 1990 ACM Sigmetrics conference on Measurement and modeling of computer systems, 1990, pp. 214-225, ACM Press, New York, NY.

Terence Kelly et al., U. S. Appl. No. 11/069,198, filed Feb. 28, 2005.

Cipriano Santos et al., U. S. Appl. No. 11/069,385, filed Feb. 28, 2005.

Dirk Beyer et al., U. S. Appl. No. 11/116,687, filed Apr. 27, 2005.

Todd Tannenbaum et al., Condor—A Distributed Job Scheduler, Beowulf Cluster Computing with Linux, Thomas Sterling, editor, Oct. 2001, The MIT Press, Cambridge, MA.

* cited by examiner

US 8,281,313 B1

SCHEDULING COMPUTER PROCESSING JOBS THAT HAVE STAGES AND PRECEDENCE CONSTRAINTS AMONG THE STAGES

FIELD OF THE INVENTION

The present invention relates to the field of computing. More particularly, the present invention relates to the field of computing where computer processing jobs are scheduled for execution.

BACKGROUND OF THE INVENTION

Scheduling is a basic research problem in both computer science and operations research. The space of problems is vast. A subset of this problem space is non-preemptive multiprocessor scheduling without processor-sharing. Generally, techniques for solving non-preemptive multi-processor scheduling problems are based upon an objective function, which a scheduling tool seeks to optimize. Such objective functions include, the completion time of the last job (i.e., the makespan) or mean completion time. Jobs may be made up of one or more tasks.

In many cases, task dispatching decisions are made manually by human operators. For example, a human operator may assign ordinal priorities (e.g., most important, medium importance, least important) to a set of tasks and as resources become available tasks are selected from an assignable pool of tasks according to their ordinal priority. This approach does not scale, is labor intensive, error prone, and often results in undesirable dispatching sequences (e.g., low utilization, uneven load, violated assignment constraints, and violated precedence constraints).

Automated dispatchers are based on fixed dispatching rules such as FIFO (first-in, first-out), round robin, lowest utilization first, and fair share. As a result, automated dispatching sequences are inflexible. In some cases, automated dispatching rules can be changed by a human operator while a system is in operation. This allows for improved performance but requires human intervention.

SUMMARY OF THE INVENTION

The present invention comprises a method of scheduling computer processing jobs. According to an embodiment, the method begins with a first step of receiving job properties for a plurality of jobs to be processed in a multi-processor computing environment. At least some of the jobs each comprise a plurality of stages, one or more tasks for each stage, and precedence constraints among the stages. The method continues with a second step of determining a schedule for processing at least a subset of the plurality of jobs on processors within the multi-processor computing environment from a solution of a mathematical program that provides a near maximal completion reward. The schedule comprises a sequence of tasks for each processor. In a third step, the computer processing jobs are processed on the processors according to the sequence of tasks for each processor.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention comprises a method of scheduling computer processing jobs in a multi-processor computing environment. The computer processing jobs comprise multi-task jobs each having a plurality of stages with one or more tasks per stage and precedence constraints among the stages. Each stage includes computational tasks that may be executed in parallel. All tasks in a stage must complete before any tasks in the next stage may begin execution. In other words, the tasks in a later stage are subject to a precedence constraint that requires the preceding stage's tasks finish processing before any of the tasks in the later stage may begin processing. There are no precedence constraints between tasks of different computer processing jobs.

Figure 1:
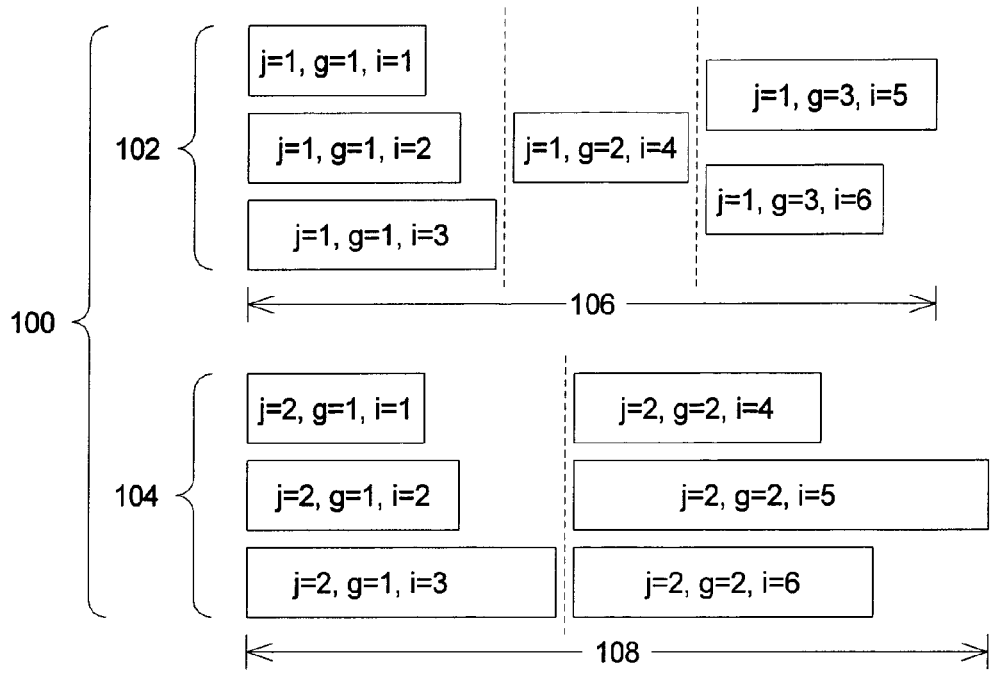
FIG. 1 illustrates a set of multi-stage computer processing jobs processed according to an embodiment of a method of scheduling computer processing jobs as a task chart in accordance with an embodiment of the present invention.

An embodiment of a set of multi-stage computer processing jobs that may be processed according to embodiments of the method of the present invention is illustrated as a task chart in FIG. 1. The set of multi-stage jobs 100 includes first and second jobs, 102 and 104. The first job 102 (also indicated by j=1) includes three stages, indicated by g∈{1, 2, 3}, and six tasks, indicated by i∈{1, 2, . . . , 6}. The second job 104 (also indicated by j=2) includes two stages, indicated by g∈{1, 2}, and six tasks, indicated by i∈{1, 2, . . . , 6}. The first and second jobs, 102 and 104, may be characterized by first and second critical path lengths, 106 and 108, which are the times required to process the first and second jobs, 102 and 104, respectively, if an unlimited number of processors are available.

The problem of scheduling the multi-stage computing processing jobs may be described more formally as follows. The multi-stage computer processing jobs comprise a set of jobs j∈J. Job j contains a set of stages g∈G(j). A set of tasks i in stage g of job j is denoted as S(g,j). Stages encode precedence constraints among tasks within a job. No task in stage g+1 may begin until all tasks in stage g have completed. Stages represent a special case of "series-parallel" precedence constraints or interval based precedence constraints. Precedence constraints do not exist among tasks of different jobs.

A job completes when all of its tasks have completed, and a reward is accrued if the job completes by its due time $D_j$. In any schedule of all of the jobs j∈J, each job j has a completion time $C_j$ and a completion reward $R_j$. The goal is to sequence tasks onto processors in such a way that the final schedule maximizes the aggregate reward $R_\Sigma$. The aggregate reward $R_\Sigma$ may be given by:

$$R_\Sigma = \sum_{j=1}^{J} U_{D(j)}(C_j)$$

where $U_{D(j)}(C_j)$ is utility for the completion time $C_j$ of job j and may be given by $U_{D(j)}(C_j) = R_j$ if $C_j \leq D_j$ and $U_{D(j)}(C_j) = 0$ otherwise. (Note that the due time $D_j$ appears as the due time D(j) in places where the due time is a subscript.) Utility may be expressed as a dollar value or as points on an arbitrary scale or in some other units. The definition of $U_{D(j)}(C_j)$ may be extended to allow a lesser positive reward for jobs that complete after the due time.

The problem of scheduling the multi-stage computer processing jobs with arbitrary completion rewards and arbitrary task execution times is NP-hard to approximate within any constant factor. A particular problem is NP-hard if another problem known to be NP-complete can be reduced to the particular problem in polynomial time. With unit completion rewards and unit task execution times, the problem of scheduling the computer processing jobs is NP-complete. The terms "NP-hard" or "NP-complete" mean that an exact solution can only be obtained within a feasible time period, if at all, for a small problem size. Providing more computing power only slightly increases the problem size for which one can expect to find the exact solution if such a solution exists at all. The terms "NP-hard" and "NP-complete" come from complexity theory, which is well known in the computer science and scheduling disciplines.

In an embodiment, the multi-stage computer processing jobs comprise a batch of animation processing jobs. For example, the batch of animation processing jobs may be brief excerpts of a computer-animated film that is in production. Typically, each of the brief excerpts is processed in a series of stages which must be processed in a particular order. For example, the series of stages may begin with simulation of physical movement followed by model baking, then frame rendering, and concluding with film clip assembly.

Other computer processing jobs have a similar multi-stage structure in which stages include tasks that may be executed in parallel and later stages are subject to precedence constraints that require tasks in earlier stages to complete processing before the tasks of the later stages may begin processing. Examples include protein sequence matching, certain classes of fast Fourier transformations, petroleum exploration workloads, and distributed data processing.

Figure 2:
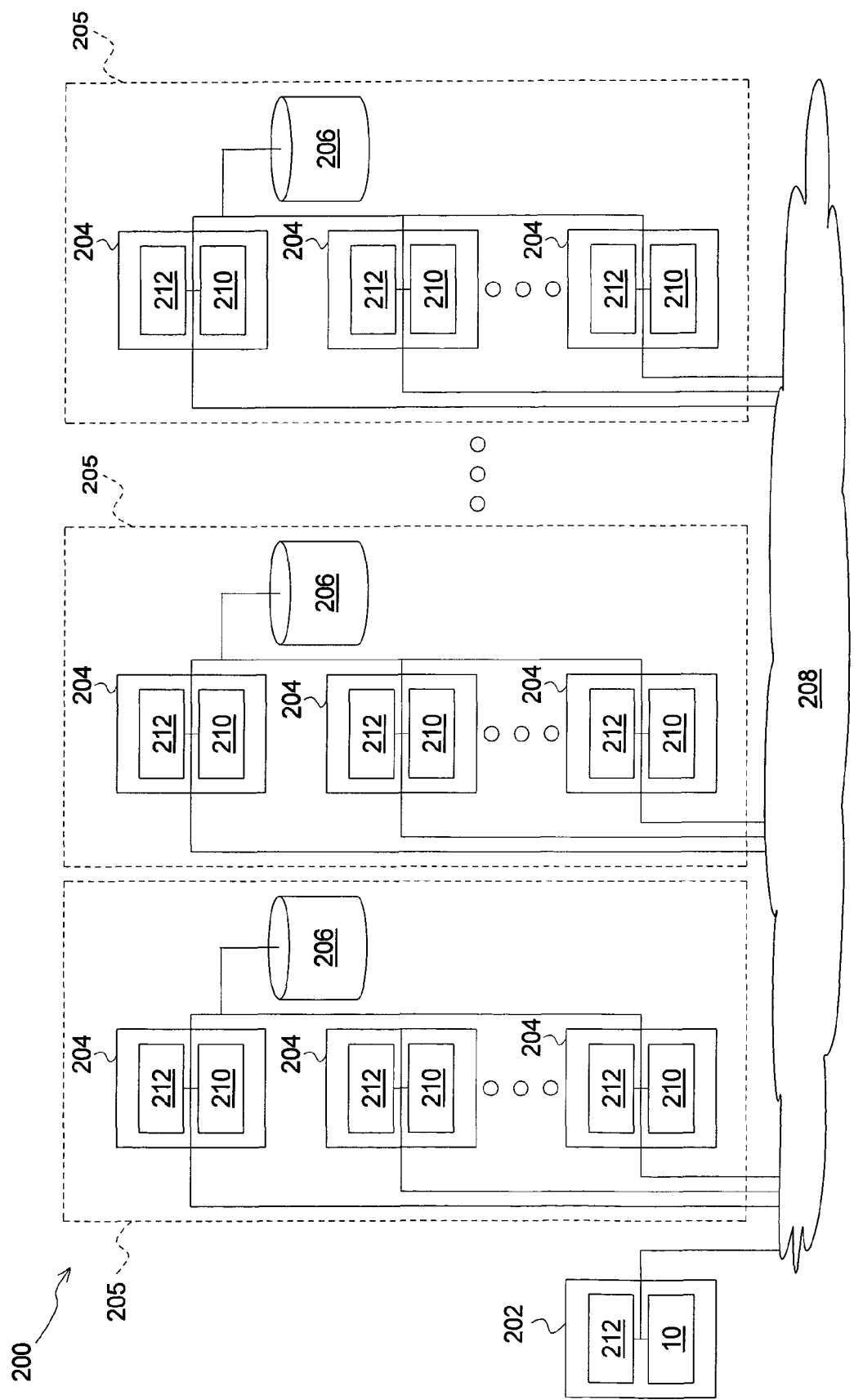
FIG. 2 schematically illustrates a multi-processor computing environment that processes computer processing jobs according to a method of scheduling computer processing jobs in accordance with an embodiment of the present invention.

An embodiment of a multi-processor computing environment that employs a method of scheduling computer processing jobs of the present invention is schematically illustrated in FIG. 2. The multi-processor computing environment 200 comprises a scheduler 202 and a plurality of clusters 205, which are coupled together by a network 208. Each cluster 205 comprises a plurality of servers 204 and storage 206. In an embodiment, the scheduler 202 comprises a processor 210 and memory 212. In an embodiment, each server 204 comprises a processor 210 and memory 212. In another embodiment, one or more servers 204 further comprise one or more additional processors. In an alternative embodiment, the storage 206 of each of the clusters 205 is a portion of a storage pool that is coupled to the servers 204 by a SAN (storage area network). More generally, a multi-processor computing environment that employs a method of scheduling computer processing jobs of the present invention includes a plurality of processors, memory, and storage. In this general multi-processor computing environment, one or more of the processors acts as a scheduler. Alternatively, the scheduler is located separately from the multi-processor computing environment. The scheduler is a computing entity that determines a schedule as part of a method of scheduling computer processing jobs of the present invention.

Figure 3:
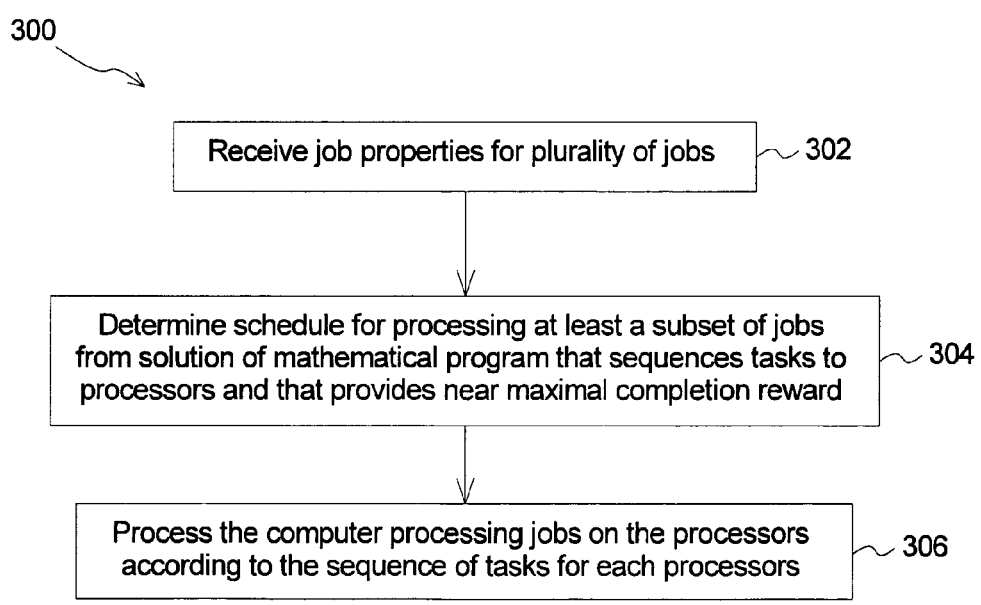
FIG. 3 illustrates an embodiment of a method of scheduling computer processing jobs of the present invention as a flow chart.

An embodiment of a method of scheduling computer processing jobs in a multi-processor computing environment of the present invention is illustrated as a flow chart in FIG. 3. The method 300 begins with a first step 302 of receiving job properties for a plurality of jobs to be processed in the multi-processor computing environment. At least some of the jobs each comprise a plurality of stages, one or more tasks for each stage, and precedence constraints among the stages. The method continues with a second step 304 of determining a schedule for processing at least a subset of the plurality of jobs from a solution of a mathematical program that sequences tasks to processors within the multi-processor computing environment and that provides a near maximal completion reward. The schedule determined in the second step includes a sequence of tasks for each of the processors within the multi-processor computing environment.

In an embodiment, the mathematical program is a Mixed Integer Program (MIP), which may be solved using a commercially available solver such as CPLEX. Alternatively, the mathematical program is an integer program, which also may be solved using a commercially available solver. The MIP and an appropriate solver guarantee an optimal solution of the formulated MIP if run to termination. Beyond some large real-world problem size, the MIP and the appropriate solver provide a feasible solution for the formulated MIP and a conservative estimate of a lower bound of an optimal solution. In an embodiment, the MIP includes decision variables, state variables, input and derived parameters, constraints, and an objective. The decision variables include task-to-processor assignment decision variables, job selection decision variables, job-to-processor assignment decision variables, and stage sequence decision variables. The state variables are derived from the decision variables; they are intermediate results that improve the formulated MIP. The state variables include stage-at-processor completion time variables and job completion time variables. The constraints include tasks precedence constraints, job completion time constraints, job selection constraints, processor constraints, and sequence constraints. In an embodiment, the objective comprises maximizing a sum of completion rewards for jobs completed by the due time.

A more detailed description of an embodiment of a MIP of the present invention is described as follows. The MD employs indices and sets listed in table 1.

TABLE 1

| Indices and sets | Description |
| --- | --- |
| $\psi \in \Psi$ | Set of users, user groups, or a combination thereof |
| $j \in J(\psi)$ | Set of jobs from user or user group $\psi$ |
| $k \in K$ | Cluster of processors |
| $p \in P(k)$ | Set of processors at cluster k |
| k(p) | Denotes the corresponding cluster k for processor p |
| $i \in S(gj)$ | Set of tasks i of stage g of job j |
| $g \in G(j)$ | Set of stages g for job j |
| $l = l(j)$ | Last stage l of job j |

Input and derived parameters for the MIP are listed in Table 2. The completion reward $R_j$ of job j has some value if job j is completed by the due time. Otherwise, it is zero. Alternatively, the completion reward $R_j$ may be reduced by a penalty if job j is not completed by the due time. A total processing time available W between a release time and a due time may be given by:

$$W = H \sum_{k \in K} |P(k)|$$

TABLE 2

| Parameters | Description |
| --- | --- |
| $D_j$ | Time available between release time (or present time) and due time for job j |
| $R_j$ | Completion reward for job j if it is finished on time |
| $t_{g,j}^p$ | Average processing time at processor p for stage g of job j |
| $n_{g,j}$ | Number of tasks of stage g of job j |
| H | Maximum time available in a processing period |
| $f_\psi$ | Percentage of total processing time allocated to user or group of users $\psi$ over a period of time, where $$\sum_{\psi \in \Psi} f_\psi = 1$$ |
| W | Total processing time available between release time and due time |
| $\tau_\psi$ | Consumption of time by user or user group $\psi$ |

The decision variables include task-to-processor assignment decision variables, job selection decision variables, job-to-cluster assignment decision variables, job-to-processor assignment decision variables, and stage sequence decision variables. The task-to-processor assignment decision variables indicate quantity of tasks of stage g of job j that are assigned to processor p and may be given by:

$$x_{g,j}^p \geq 0$$

The job selection decision variables indicate the jobs that are processed in a processing period and may be given by:

$$z_j = \begin{cases} 1 & \text{job } j \text{ is selected} \\ 0 & \text{otherwise} \end{cases}$$

Each of the job-to-cluster assignment decision variables indicates an assignment of a job to a cluster of processors and may be given by:

$$y_{j,k} = \begin{cases} 1 & \text{cluster } k \text{ process all tasks of job } j \\ 0 & \text{otherwise} \end{cases}$$

Each of the job-to-processor assignment decision variables indicates an assignment of at least one task of a job to a processor and may be given by:

$$\delta_{j,p} = \begin{cases} 1 & \text{processor } p \text{ processes one or more tasks of job } j \\ 0 & \text{otherwise} \end{cases}$$

The stage sequence decision variables indicate stage and job sequences and may be given by:

$$v_{(g,j),(g',j')} = \begin{cases} 1 & \text{tasks in } (g', j') \text{ follow tasks in } (g, j) \text{ if assigned to processor } p \\ 0 & \text{otherwise} \end{cases}$$

The stage sequence decision variables cover stage sequences within a single job (i.e., stage g and stage g' are part of a single job indicated as both job j and job j') and stage sequences between two jobs (i.e., stage g is part of a first job j and stage g' is part of a second job j').

The state variables include stage-at-processor completion time variables, stage-at-cluster completion time variables, and job completion time variables. The stage-at-processor completion time variables $c_{g,j}^p$ provides a completion time of stage g of job j at processor p.

The stage-at-cluster completion time variables $C_{g,j}^k$ provide a completion time of stage g of job j at cluster k and may be given by:

$$C_{g,j}^k = \text{Max}\{c_{g,j}^p : p \in P(k)\}$$

The job completion time variables $CJ_j$ provide a completion time of job j and may be given by:

$$CJ_j = \text{Max}\{C_{l(j),j}^k : k \in K\}$$

The constraints comprise tasks precedence constraints, job completion time constraints, job selection constraints, fair share constraints, affinity constraints, cluster constraints, processor constraints, and sequence constraints.

The task precedence constraints ensure that tasks at a particular stage cannot start processing until a previous stage completes processing. The task precedence constraints may be given by:

$$c_{g,j}^p \geq c_{g',j}^p + t_{g,j}^p x_{g,j}^p - B(1 - v_{(g',j')(g,j)})$$

$$c_{g,j}^p \geq C_{g-1,j}^{k(p)} + t_{g,j}^p g \geq 2$$

$$C_{g,j}^{k(p)} \geq c_{g,j}^p$$

where B is a sufficiently large constant to ensure correct operation of these constraints when stage g' of job j' precedes stage g of job j.

The job completion time constraints ensure that the completion time of job j equals or exceeds the completion time of the last stage l(j) of job j on any cluster. The job completion time constraints may be given by:

$$CJ_j \geq C_{l,j}^k \forall k \in K$$

The job selection constraints assure that jobs are completed by the due time and may be given by:

$$z_j \leq D_j - CJ_j + 1$$

If the right hand side of a particular job selection constraint is zero or negative (e.g., 1 sec. late), the particular constraint is infeasible. This forces the second decision variable $z_j$ to take a value of zero, which forces the job completion time $CJ_j$ to zero and satisfying the particular job selection constraint.

The fair share constraints may assure that at least some jobs for each user or user group $\psi$ are processed. Alternatively, the fair share constraints may limit the number of jobs that are processed for each user or user group $\psi$. Or, the fair share constraints may assure that at least some jobs for each user or user group $\omega$ are processed while limiting the number of jobs that are processed for each user or user group $\psi$. The fair share constraints may be implemented as hard constraints, either as a hard fraction or a range of fractions, or as soft constraints. The fair share constraints implemented as hard fractions may be given by:

$$\sum_{\substack{g \in G(j), j \in J(\psi) \\ p \in p(k), k \in K}} t_{g,j}^p x_{g,j}^p \leq f_\psi * W - \tau_\psi$$

The fair share constraints implemented as soft constraints may allow violation of either the hard fractions or the range of fractions while imposing penalty terms, which reduce the completion reward. Fair share constraints that assign different factions to different users or user groups may be referred to as weighted fair share constraints as opposed to un-weighted fair share constraints that provide equal fractions to users or user groups.

The affinity constraints ensure that all tasks of job j are assigned to no more than one of the clusters of processors and may be given by:

$$\sum_{k \in K} y_{j,k} = z_j$$

The cluster constraints ensure that all of the tasks of stage g of job j are processed by cluster k and may be given by:

$$\sum_{p \in P(k)} x_{g,j}^p = y_{j,k} n_{g,j}$$

The processor constraints ensure that tasks are assigned to a processor and may be given by:

$$x_{g,j}^p \leq n_{g,j} * \delta_{j,p}$$
$$\delta_{j,p} \leq \sum_{g \in G(j)} x_{g,j}^p$$

The sequence constraints ensure a consistent ordering of jobs and stages. The sequence constraints may be given by:

$$v_{(g,j)(g',j')} + v_{(g',j')(g,j)} \geq \delta_{j,p} + \delta_{j',p} - 1$$

$$v_{(g,j)(g',v')} + v_{(g',v')(g,v)} \leq 1$$

In an embodiment, the objective seeks to maximize the completion reward and may be given by:

$$\text{Maximize} \sum_{j \in J(\psi)} R_j z_j$$

In an alternative embodiment, the objective seeks to maximize the completion reward and to minimize penalties. For example, such penalties may be for not completing jobs by the due time or for violating fair share constraints.

The method 300 (FIG. 3) concludes with a third step 306 of processing the computer processing jobs on the processors within the multi-processor computing environment according to the sequence of tasks for each processor.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of scheduling a plurality of computer processing jobs comprising:
   determining, by executing instructions on a scheduling processor, a schedule for processing the plurality of computer processing jobs on processors within a multi-processor computing environment, wherein each job has a plurality of stages, at least one task for each stage, precedence constraints among the stages, and a job completion due time, wherein the precedence constraints include a particular precedence constraint between a first of the stages and a second of the stages, where each of the first and second stages has plural tasks, wherein a completion reward accrues for a job if the job completes by the corresponding job completion due time, and wherein the determined schedule assigns sequences of tasks to the processors in a manner that maximizes a sum of the completion rewards for the plurality of computer processing jobs; and
   processing the plurality of computer processing jobs on the processors within the multi-processor computing environment according to the determined schedule.

2. The method of claim 1 wherein the instructions executed by the scheduling processor comprise a mixed integer program.

3. The method of claim 2 wherein the mixed integer program comprises decision variables, state variables, input and derived parameters, constraints, and an objective.

4. The method of claim 3 wherein the decision variables comprise task-to-processor assignment decision variables, job selection decision variables, job-to-processor assignment decision variables, and stage sequence decision variables.

5. The method of claim 3 wherein the state variables comprise stage-at-processor completion time variables and job completion time variables.

6. The method of claim 5 wherein the state variables further comprise stage-at-cluster completion time variables.

7. The method of claim 3 wherein the constraints of the mixed integer program comprise tasks precedence constraints, job completion time constraints, job selection constraints, processor constraints, and sequence constraints.

8. The method of claim 3 wherein the objective comprises minimizing penalties.

9. The method of claim 8 wherein the penalties comprise fair share violation penalties.

10. The method of claim 8 wherein the penalties comprise due time violation penalties.

11. The method of claim 1, wherein the determining comprises finding a solution to a program that includes solving for decision variables of the program, wherein the decision variables include task-to-processor assignment variables, where each of the task-to-processor assignment variables represents a number of tasks assigned to a corresponding one of the processors.

12. The method of claim 11, wherein the decision variables further include job-to-processor assignment variables each indicating an assignment of at least one task of a corresponding one of the jobs to a corresponding one of the processors.

13. A non-transitory computer readable medium comprising computer code that upon execution cause a computer to:
   determine a schedule for processing a plurality of computer processing jobs on processors within a multi-processor computing environment, wherein each job has a plurality of stages, at least one task for each stage, precedence constraints among the stages, and a job completion due time, wherein the precedence constraints include a particular precedence constraint between a first of the stages and a second of the stages, where each of the first and second stages has plural tasks, wherein a completion reward accrues for a job if the job completes by the corresponding job completion due time, and wherein the determined schedule assigns sequences of tasks to the processors in a manner that maximizes a sum of the completion rewards for the plurality of computer processing jobs; and
   process the plurality of computer processing jobs on the processors within the multi-processor computing environment according to the determined schedule.

14. The computer readable medium of claim 13, wherein the determining comprises finding a solution to a program that includes solving for decision variables of the program, wherein the decision variables include task-to-processor assignment variables, where each of the task-to-processor assignment variables represents a number of tasks assigned to a corresponding one of the processors.

15. The computer readable medium of claim 14, wherein the decision variables further include job-to-processor assignment variables each indicating an assignment of at least one task of a corresponding one of the jobs to a corresponding one of the processors.

* * * * *